2,956,080

Patented Oct. 11, 1960

2,956,080
PROCESSES FOR PREPARING β-ALANINE

Ralph H. Beutel, Newark, and Peter P. Klemchuk, Plainfield, N.J., assignors to Merck & Co., Inc., Rahway, N.J., a corporation of New Jersey No Drawing. Filed June 1, 1953, Ser. No. 358,958

4 Claims. (Cl. 260—534)

This invention is concerned generally with the recovery of β-alanine from its salts. More particularly, it relates to a novel process for the alkaline hydrolysis of β-aminopropionitrile to form salts of β-alanine and to the subsequent recovery of the β-alanine in substantially quantitative yields. β-alanine, the chemical name of which is β-aminopropionic acid, can be utilized in known manner in the synthesis of pantothenic acid, an essential dietary factor in the growth of certain animals.

Heretofore, β-aminopropionitrile has been converted to β-alanine by either acid or alkaline hydrolysis but many difficulties and disadvantages have attended the use of both of these techniques. In acidic hydrolysis using, for example, hydrochloric acid, the β-alanine which will be produced will be contaminated with a considerable amount of ammonium chloride, which can be separated only with difficulty. In the preferred alkaline hydrolysis employing barium hydroxide, sulfuric acid was subsequently added to remove the barium as the insoluble sulfate, leaving free β-alanine in solution. The neutralization was time-consuming and necessitated careful control; because of the slimy nature of the barium sulfate precipitate, filtration was difficult and considerable amounts of β-alanine were lost in the filter cake; as an alternative to filtration, a time-consuming centrifugation was sometimes employed.

It has now been discovered that β-aminopropionitrile can be converted to β-alanine by a novel process which is rapid and practically quantitative, resulting in yields averaging 97%.

In carrying out our novel process, β-aminopropionitrile is hydrolyzed with the hydroxide of an alkali or alkaline earth metal, the resulting solution of the β-alanine salt is contacted with a cation exchange resin on the hydrogen or ammonium cycles, and β-alanine is recovered from the resin effluent.

Alkali metal hydroxides are preferred for hydrolysis of the nitrile because they react quickly and produce substantially quantitative yields of acid salt. Of these, sodium hydroxide is particularly suitable because of its low cost. Maximum yields are obtained when the hydrolyzing base is employed in an amount slightly in excess of stoichiometric proportions. While the concentration of the base is not critical, the use of a 5–10% solution is preferred.

During the hydrolysis, the reaction mixture is ordinarily distilled to about one-half its volume to remove the ammonia which is evolved. At the same time, any volatile impurities which may be present will also be removed. This step serves to increase the efficiency of the cation exchanger by removing potentially competing cations when operating on the hydrogen cycle and by decreasing the concentration of the liberated ion when operating on the ammonium cycle. The concentrated solution of the β-alanine salt is filtered to remove any insoluble material and the filtrate is diluted with sufficient water to form the equivalent of a 10% solution of β-alanine. While this concentration is not critical, it is preferred because of the comparatively large volume of resin which is used in the process. A more concentrated solution would be smaller in volume than the resin, which would necessitate flushing the β-alanine through the resin.

The solution of the β-alanine salt is next contacted with the cation-exchange resin present in such quantity that it possesses at least the requisite amount of functional groups. While the cation-exchange reaction may be effected either batchwise or columnwise, it is preferred to pass the aqueous solution of the β-alanine salt through a column of the resin because of the increased resin efficiency thus obtained.

The resin effluent together with the water used to wash the resin after completion of the cation-exchange, is concentrated to a small volume by distillation. This serves also to remove ammonia introduced by the cation-exchanger when operating on the ammonium cycle. To the concentrated solution, which is now a thick slurry of β-alanine, a lower aliphatic alcohol, preferably methanol, is added, and the mixture cooled to about −10° C. The suspension is then filtered and the filter cake consisting of substantially pure β-alanine is dried.

For the cation-exchange step in the above-outlined process, cation-exchange resins such as the carboxylic acid type and the sulfonic acid type operating on the ammonium cycle are generally suitable, but the use of a carboxylic-acid type exchanger operating on the ammonium cycle is preferred since it has greater capacity than the sulfonic acid resin system. Strong exchangers tend to bind the amphoteric β-alanine through its amino group resulting in a decreased efficiency for both the exchanger and the overall process. Resins suitable in the practice of this invention include: (1) Cation-exchange resins deriving their exchange capacity essentially from carboxylic groups; such resins are formed, in general either by condensing a phenol and an aldehyde, one of which contains a carboxyl group, particularly resorcylic acid and formaldehyde, or by the copolymerization of a polymerizable acid with a divinyl compound, i.e. a compound having two $CH_2=CH-$ groups, such, for example, as acrylic or methacrylic acid and divinyl benzene. Resins of this type are described in United States Patents No. 2,319,359; No. 2,333,754; No. 2,340,110; No. 2,340,111, and others, and are characterized by the common quality of having their cation-exchange ability dependent upon carboxyl groups in the resin molecule. In the practice of the present invention, we prefer to use a copolymer of acrylic or methacrylic acid and divinyl benzene wherein the divinyl benzene component constitutes from 2.5 to 5% of the resin composition. Commercially available resins of this type are Amberlite IRC–50 manufactured by Rohm & Haas Co., Philadephia, Pennsylvania; Alkalex, a carbonaceous zeolite produced by Infilco Co., Chicago, Illinois; Duolite CS–100, manufactured by the Chemical Process Company, Redwood City, California; and Permutit 216, produced by the Permutit Co., New York, New York; and (2) Cation-exchange resins containing nuclear sulfuric acid groups or methylene sulfonic acid groups as, for example, phenol-formaldehyde type resins containing nuclear sulfonic acid groups, or sulfonated aromatic hydrocarbon polymers such as sulfonated polystyrene resins; commercially-available resins of this type are Amberlite IR–100, a phenol-formaldehyde resin containing sulfonic acid and some phenolic groupings manufactured by Rohm & Haas Co.; Catex, a sulfonated coal containing polyfunctional sulfuric acid groupings produced by the Infilco Co.; Duolite C–3, a phenol-formaldehyde resin containing sulfonic acid groupings manufactured by the Chemical Process Company; and Ionac C–200, a phenol-formaldehyde resin containing sulfonic acid groupings produced by American Cyanamid, Rockefeller Plaza, New York.

The cation-exchangers sold commercially are generally on the hydrogen cycle but may easily be converted to the ammonium cycle by washing with aqueous ammonia. Undesirable colored matter which is oftentimes associated with new resins may be removed prior to use by repeated successive conversions of the exchangers through the hydrogen, ammonium and sodium cycles. After use in the process of this invention, the exhausted cation-exchanger, which is now on the alkali metal or alkaline earth metal cycle, may be regenerated by washing with dilute acid and rinsing with water. If the preferred ammonium cycle is employed, a wash with dilute aqueous ammonia should follow the rinse with water in the regeneration phase.

The following example is included by way of illustrating the practice of this invention, but it is to be understood that modifications and alternatives as hereinabove described may be employed with similar advantage.

*Example 1*

A stainless steel flask was charged with 690 ml. of distilled water and 241.6 g. (2.05 moles) of 34% high grade caustic soda. Upon addition of 136.6 g. (1.95 moles) of clear, colorless $\beta$-aminopropionitrile to the diluted caustic soda, a slight rise in temperature and evolution of ammonia were noted. The solution was heated to boiling and was uniformly distilled over a period of three and one-half hours during which time 475 ml. of distillate was collected at a vapor temperature of 91–100° C. The reaction mixture was cooled to 30° C. and filtered through a sintered glass funnel to remove a small amount of insoluble material. The clear, colorless filtrate containing sodium $\beta$-alaninate was diluted to a volume of 1730 ml. with distilled water, equivalent to an approximately 10% solution with respect to $\beta$-alanine.

Four hundred grams of Amberlite IRC–50 (a carboxylic type cation exchange resin manufactured by Rohm & Haas, Philadelphia, Pennsylvania, which can be prepared in accordance with the reference procedures set forth hereinabove) obtained on the hydrogen cycle was converted through the ammonium, sodium, and hydrogen cycles, as follows: The resin was converted to the ammonium cycle from the hydrogen cycle by passage of 2% aqueous ammonia through the resin bed contained in a column, during which treatment the resin bed is swelled about 30%. The resin was converted from the ammonium cycle to the sodium cycle by passage through the column of an excess of 10% aqueous solution of $\beta$-alanine in excess caustic soda. The resin was then regenerated from the sodium cycle to the hydrogen cycle by passing through the column a 5% aqueous sulfuric acid solution, whereupon the resin bed contracted to its original volume. The resin bed was washed free of sulfate with 5000 ml. of distilled water. This procedure was repeated three times and the effluent was thereby freed of undesirable color.

The Amberlite IRC–50 resin, prepared as set forth hereinabove and on the hydrogen cycle, was converted from the hydrogen cycle to the ammonium cycle by passing 3020 ml. of 2% aqueous ammonia through the resin bed in a column; the ammonia solution was followed by a 2000 ml. distilled water wash. The aqueous solution of sodium $\beta$-alaninate, prepared as described hereinabove, was passed through this resin column on the ammonium cycle at a rate of 29 ml. per minute. The first 250 ml. of effluent was discarded and the remainder was collected. The resin was washed with sufficient water to give a total of 4320 ml. of a clear, colorless solution containing $\beta$-alanine and ammonia.

This aqueous solution of $\beta$-alanine and ammonia was evaporated at a pressure of one atmosphere to a volume of 2550 ml. and was then evaporated under a 70 mm. of mercury pressure to a volume of 650 ml. The concentrated solution was stirred with charcoal, filtered, and the filtered solution was extracted with 150 ml. of chloroform. The aqueous solution was evaporated further at a pressure of 70 mm. to a thick slurry, 780 ml. of methanol was added, and the slurry was cooled at a temperature of about –10° C. for a period of approximately two hours. The precipitated material was recovered by filtration, washed with cold methanol and dried to give 163.8 g. of colorless, crystalline $\beta$-alanine, M.P. 198.3° C. (dec.); yield approximately 97% of theory.

Insofar as changes and modifications may be made in carrying out the present invention without departing from the spirit and scope thereof, and insofar as these changes and modifications are within the purview of the annexed claims, they are to be considered as part of our invention.

We claim:

1. The process which comprises contacting a solution containing an alkali metal salt of $\beta$-alanine with a carboxylic-type cation-exchange resin operating on the ammonium cycle, thereby forming an effluent essentially free of metal cations and containing $\beta$-alanine and ammonia, evaporating the ammonia from said effluent to produce a concentrated solution of $\beta$-alanine free of ammonia and metal cations, and recovering $\beta$-alanine from the concentrated solution.

2. In the process of recovering $\beta$-alanine in a yield of about 97% of that theoretically obtainable from a solution containing a salt of $\beta$-alanine selected from the group consisting of alkali metal salts of $\beta$-alanine and alkaline earth metal salts of $\beta$-alanine, the step which comprises contacting said solution with a carboxylic-type cation-exchange resin operating on the ammonium cycle, thereby forming an effluent essentially free of metal cations and containing $\beta$-alanine and ammonia.

3. In the process of recovering $\beta$-alanine in a yield of about 97% of that theoretically obtainable from a solution containing sodium $\beta$-alaninate, the step which comprises contacting said solution with a carboxylic-type cation-exchange resin operating on the ammonium cycle, thereby forming an effluent essentially free of metal cations and containing $\beta$-alanine and ammonia.

4. The process which comprises contacting an aqueous solution of sodium $\beta$-alaninate with a carboxylic acid type cation-exchange resin operating on the ammonium cycle, thereby forming an effluent essentially free of sodium ions and containing $\beta$-alanine and ammonia, evaporating the ammonia from said effluent to produce a concentrated solution of $\beta$-alanine free of ammonia and metal cations, and recovering $\beta$-alanine from the concentrated solution.

References Cited in the file of this patent

UNITED STATES PATENTS

| | | |
|---|---|---|
| 2,334,163 | Kirk | Nov. 16, 1943 |
| 2,336,067 | Carlson | Dec. 7, 1943 |
| 2,416,630 | Kirk | Feb. 25, 1947 |
| 2,511,825 | Myers | June 13, 1950 |
| 2,700,054 | White | Jan. 18, 1955 |

OTHER REFERENCES

Myers et al.: Ind. and Eng. Chem., vol. 33; No. 6, pages 697–706 (1941).

Buc et al.: J. Am. Chem. Soc., vol. 67 (1945), pps. 92–94.

Davies, Chemistry and Industry, Jan. 24, 1948, pages 51–54.